US010701009B1

(12) United States Patent
Li et al.

(10) Patent No.: US 10,701,009 B1
(45) Date of Patent: Jun. 30, 2020

(54) MESSAGE EXCHANGE FILTERING

(71) Applicant: Amazon Technologies, Inc., Seattle, WA (US)

(72) Inventors: Jackie Yu Hao Li, Richmond (CA); André Robert Wilbrod Dufour, Vancouver (CA); Abhishek Prajapati, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 14/822,394

(22) Filed: Aug. 10, 2015

(51) Int. Cl.
*H04L 12/58* (2006.01)

(52) U.S. Cl.
CPC .............. *H04L 51/14* (2013.01); *H04L 51/28* (2013.01)

(58) Field of Classification Search
CPC ................................ H04L 51/14; H04L 51/28
See application file for complete search history.

(56) References Cited

U.S. PATENT DOCUMENTS

| | | | | |
|---|---|---|---|---|
| 6,405,191 B1* | 6/2002 | Bhatt | ................ | G06F 16/24568 707/694 |
| 6,571,234 B1* | 5/2003 | Knight | ................... | G06Q 10/10 |
| 6,708,203 B1* | 3/2004 | Makar | ................... | G06F 3/0489 707/999.006 |
| 6,781,972 B1* | 8/2004 | Anderlind | ............... | H04L 51/12 370/329 |
| 7,020,132 B1* | 3/2006 | Narasimhan | ........ | H04L 12/6418 370/355 |
| 8,903,752 B1* | 12/2014 | Pacovsk | ............... | G06Q 10/063 706/20 |
| 8,935,768 B1* | 1/2015 | Tyree | .................. | G06F 21/6227 706/12 |
| 9,660,832 B2* | 5/2017 | Koul | .................... | G06Q 10/107 |
| 2005/0267941 A1* | 12/2005 | Addante | ............. | G06Q 10/107 709/206 |
| 2007/0150426 A1* | 6/2007 | Asher | .................. | G06K 9/6272 706/20 |
| 2008/0059597 A1* | 3/2008 | Blevins | ................... | G06F 9/542 709/207 |
| 2009/0099982 A1* | 4/2009 | Heuler | .................. | G06N 5/025 706/11 |
| 2009/0135743 A1* | 5/2009 | Kowalewski | ........... | H04M 3/56 370/261 |

(Continued)

*Primary Examiner* — Uzma Alam
(74) *Attorney, Agent, or Firm* — Thorpe North & Western LLP

(57) ABSTRACT

A technology is described for a message queuing service. An example method may include obtaining a message having message attributes from a shared queue that contains messages intended for destination queues and analyzing the message attributes for the message to identify a message exchange associated with the message, where the message exchange has destination queues subscribed to the message exchange that receive messages via the message exchange. An exchange filter rule for the message exchange may then be identified and used to identify subscribed destination queues linked to the exchange filter rule. The message attributes of the message may then be analyzed to determine whether the value of the message attributes satisfy the exchange filter rule, and the message may be distributed to the subscribed destination queues as a result of the value of the message attribute satisfying the exchange filter rule.

20 Claims, 9 Drawing Sheets

(56) References Cited

U.S. PATENT DOCUMENTS

| | | | | |
|---|---|---|---|---|
| 2009/0156184 A1* | 6/2009 | Chang | ............... | G06Q 30/0601 |
| | | | | 455/414.2 |
| 2010/0161547 A1* | 6/2010 | Carmel | ............... | G06F 16/9535 |
| | | | | 706/59 |
| 2011/0320538 A1* | 12/2011 | Ickman | ................... | H04L 51/12 |
| | | | | 709/206 |
| 2012/0215858 A1* | 8/2012 | Bhogal | ............... | H04L 67/2842 |
| | | | | 709/206 |
| 2015/0009818 A1* | 1/2015 | Xiao | ...................... | H04W 4/12 |
| | | | | 370/230.1 |
| 2015/0170213 A1* | 6/2015 | O'Malley | .......... | G06Q 30/0267 |
| | | | | 705/14.41 |
| 2015/0236915 A1* | 8/2015 | Mohammed | ........ | H04L 41/0893 |
| | | | | 709/223 |
| 2015/0363477 A1* | 12/2015 | Alterman | ............... | G06Q 30/02 |
| | | | | 707/756 |
| 2017/0012909 A1* | 1/2017 | Lieu | ........................ | H04L 51/18 |

* cited by examiner

700

Subscribe Queue to Message Exchange

Queue Name: MyQueue 702

Available Message Exchange(s) Based on Customer Account Permissions:
- ☐ Exchange1
- ☑ Exchange2
- ☐ Exchange3

704

Exchange Filter Rules 706

Subscribe to messages having the keyword:

Subscribe to messages not having the keyword:

Subscribe to messages sent by:

Subscribe to messages relating to Region:

Create Customer Rule

Subscribe 708

810 — Obtain a message from a shared queue in computer memory that contains messages having message attributes that contain metadata describing the message

820 — Analyze the message attributes for the message to identify a message exchange associated with the message having at least one destination queue subscribed to the message exchange that receives messages via the message exchange

830 — Identify an exchange filter rule for the message exchange used to identify subscribed destination queues linked to the exchange filter rule where the exchange filter rule specifies a value of the message attribute for the message and specifies subscribed destination queues that are subscribed to receive the message having the message attribute with the value

840 — Analyze the message attributes of the message to determine whether the value of the message attributes satisfy the exchange filter rule

850 — Identify the subscribed destination queues specified by the exchange filter rule that are subscribed to the message exchange to receive the message, as a result of the value of the message attribute satisfying the exchange filter rule

FIG. 8

MESSAGE EXCHANGE FILTERING

BACKGROUND

Distributed computing architectures in which a variety of computing devices and/or applications communicate over a communication network may be used in electronic commerce environments, enterprise environments, and other computing environments. Given the variety and number of computing devices/applications in such architectures, a large volume of messages may be communicated between such devices and/or applications. Accordingly, a message queuing service may be used to act as an intermediary for messages sent between devices, applications or computing nodes within the computing architecture. The message queuing service may facilitate delivery of a message from a source device, application, or computing node (e.g., a message publisher) to one or more destination devices, applications, or computing nodes (e.g., a message consumer). A message queuing service may store and deliver such messages between publishers and consumers using destination queues.

BRIEF DESCRIPTION OF THE DRAWINGS

FIG. 7 is a diagram that illustrates an example user interface used to subscribe a destination queue to a message exchange and define a message filtering rule used in delivering messages to the destination queue.

FIG. 8 is a flow diagram illustrating an example method for processing a message sent to a message exchange according to exchange filter rules for the message exchange.

DETAILED DESCRIPTION

Figure 1:
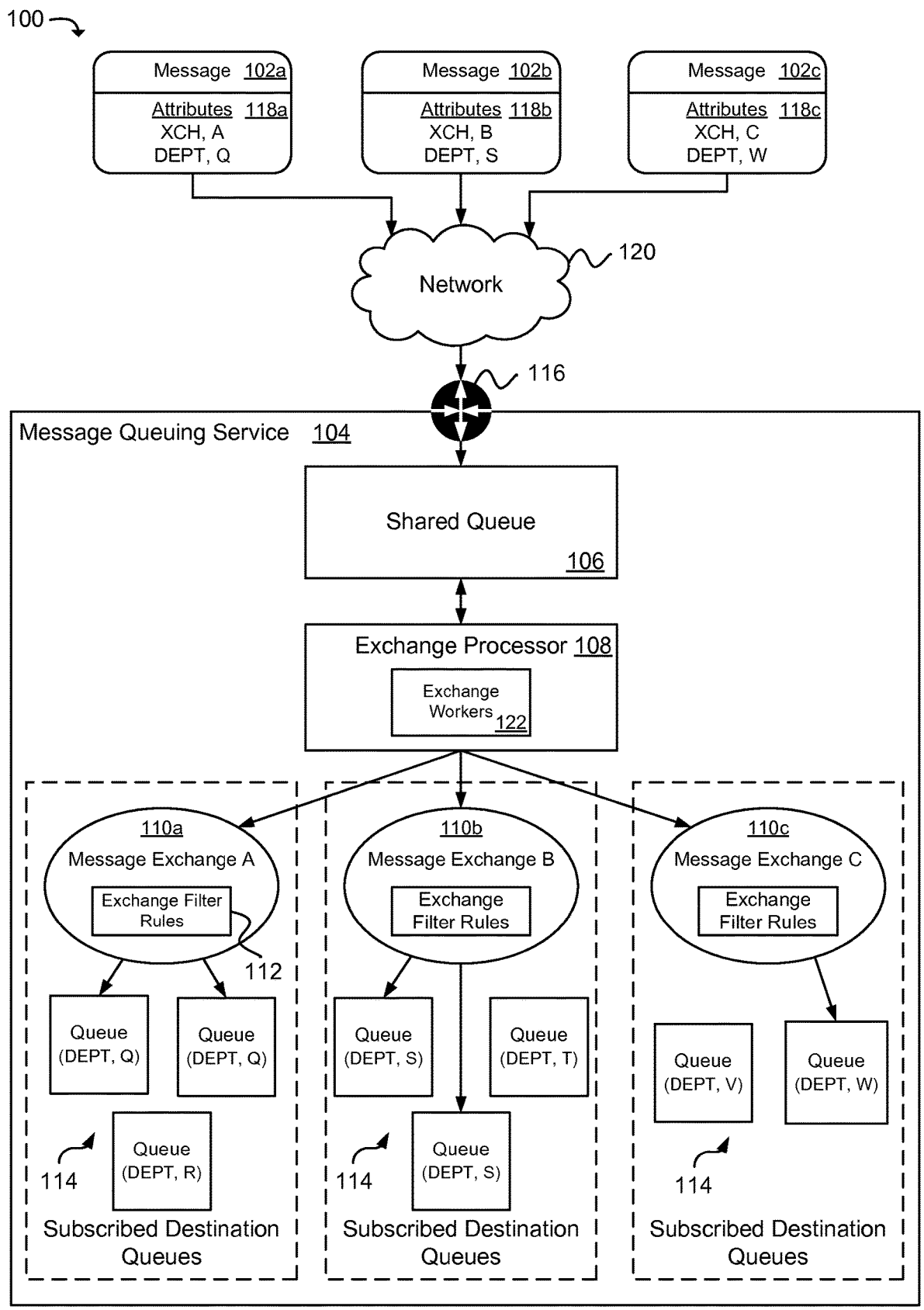
FIG. 1 is a block diagram illustrating an example system for a message queuing service having a number of message exchanges and exchange filter rules used to distribute messages to subscribed destination queues.

A technology is described for delivering messages according to customer defined filtering rules to destination queues subscribed to a message exchange. In one example, a message queuing service may include a plurality of message exchanges having destination queues that are subscribed to the message exchanges. A message exchange included in the message queuing service may have one or more exchange filter rules that may be used in distributing messages to subscribed destination queues. An exchange filter rule may be used to determine whether a message delivered to a message exchange is distributed to a particular destination queue subscribed to the message exchange.

Message publishers may send messages addressed to a message exchange to the message queuing service and the message may be distributed to destination queues subscribed to the message exchange according to the exchange filter rules. Illustratively, a message publisher may publish a message without having any knowledge of which destination queues may receive the message. For example, a message of a certain topic may be published without regard to which destination queues may receive the message. In one example configuration, a message received at the message queuing service may be placed in a shared queue. An exchange worker (e.g., a worker process thread) may retrieve the message from the shared queue and identify a message exchange for the message. After identifying a message exchange for the message, exchange filter rules associated with the message exchange may be identified. The message may include attributes that may be analyzed to determine whether any of the attributes satisfy one or more of the exchange filter rules. In the event that one or more exchange filter rules are satisfied, destination queues subscribed to the message exchange that are associated with the exchange rules may be identified, and the message may be duplicated and distributed to the destination queues.

In the past, message consumers having destination queues which are subscribed to receive messages from a message publisher may have received every message generated by the message publisher, resulting in receiving messages that may have been irrelevant to the operations of the message consumer. As a result of the present technology, a message exchange may be created and message consumers that subscribe destination queues to the message exchange may define exchange filter rules specifying which messages to deliver to the destination queues. Consequently, messages that may be relevant to a message consumer's operations may be delivered to the message consumer's destination queue, and irrelevant messages may be prevented from reaching the message consumer's destination queue.

As an illustration, a customer that manages an electronic products catalog may publish messages containing product updates for the electronic products catalog. The messages may include message attributes for the products and may be published to a message exchange and distributed to multiple product catalog geographical divisions. Customers at some geographical divisions may wish to receive messages limited to certain product updates. As such, these customers may subscribe a destination queue to the message exchange and define an exchange filter rule specifying which product updates that the customer wants to receive.

FIG. 1 is a diagram illustrating a high level example of a system 100 for a message queuing service 104 configured to perform exchange processing of messages using filtering rules to deliver messages to destination queues. The message queuing service 104 may include a shared queue 106 used to store received messages 102a-c over a physical or virtual network 120, and an exchange processor 108 configured to retrieve the messages 102a-c from the shared queue 106 and process the messages 102a-c for delivery to destination queues 114 via message exchanges 110a-c according to exchange filter rules 112.

As illustrated, messages 102a-c having attributes 118a-c may be transmitted by way of a network to the message queuing service 104. For example, a message may be transmitted over a physical network or may be transmitted using a virtual network and a virtual switch (vSwitch) connecting computing instances (virtual machines). A message 102*a-c* may be generated by a message publisher (e.g., a device, application or computing node) and may be sent to the message queuing service 104 for distribution to a number of destination queues 114 that store the message 102*a-c*. The messages 102*a-c* may then be retrieved by message consumers (e.g., a destination device, application or computing node that is not shown in FIG. 1) from respective destination queues 114.

In one example, a message 102*a-c* may include a message body containing structured data or unstructured data, and one or more message attributes 118*a-c*. For example, a message body may include Extensible Markup Language (XML), JavaScript Object Notation (JSON), or unformatted text. The message attributes 118*a-c* may be attached to a message 102*a-c* (e.g., associated with the message 102*a-c*) and, in one example, may be transmitted separately from the message body when sent from a message publisher to the message queuing service 104. In one example, a message attribute 118*a-c* may be a name/value pair. Message attributes 118*a-c* may be used to provide metadata about a message 102*a-c*. Illustratively, message attributes 118*a-c* may include structured metadata items, such as identifiers, classifications, timestamps, geospatial data, or signatures. Message attribute 118*a-c* metadata may be used to determine how to handle a message 102*a-c* without having to first process the message body of the message 102*a-c*.

Message exchanges 110*a-c* may be created for customer accounts. A message exchange 110*a-c* may be an exchange entity (e.g., a data structure) having message exchange information that may be used to deliver a message to multiple destination queues 114 that are subscribed to the message exchange 110*a-c*. A customer may request that a message exchange 110*a-c* be created on behalf of the customer, and the customer may send messages 102*a-c* to the message exchange 110*a-c*. More specifically, messages 102*a-c* addressed to a particular message exchange 110*a-c* may be published by customer devices, computing nodes, and/or applications and transmitted to a message queuing service 104, whereupon the message exchange 110*a-c* may be identified.

A customer may subscribe to a message exchange 110*a-c* in order to receive messages 102*a-c* that may be published through the message exchange 110*a-c*. A customer creating a message exchange 110*a-c* may subscribe destination queues 114 to the message exchange 110*a-c*, and/or other customers wishing to receive messages 102*a-c* published by the customer that created the message exchange 110*a-c* may subscribe to the message exchange 110*a-c*. In subscribing to a message exchange 110*a-c*, a customer may specify a destination queue 114 to which messages 102*a-c* may be delivered.

In one example, subscribing a destination queue 114 to a message exchange may include determining whether permission exists for a customer account to subscribe the destination queue 114 to the message exchange 110*a-c*. For example, a validation may be performed when subscribing a destination queue 114 to a message exchange 110*a-c* to ensure that a customer account has permissions to access both the message exchange 110*a-c* and the destination queue 114. In one example, a one-time validation for a customer account may be performed when subscribing a destination queue 114 to a message exchange 110*a-c*, such that transmission of messages 102*a-c* to the destination queue 114 may be executed without having to revalidate the customer account each time that a message 102*a-c* is sent to a destination queue 114 associated with the customer account.

In subscribing to a message exchange 110*a-c*, a customer may specify an exchange filter rule used to identify which messages to deliver to a destination queue 114. For example, a request to subscribe a destination queue 114 to a particular message exchange 110*a-c* may be submitted to the message queuing service 104. The request may include an exchange filter rule 112 defining messages 102*a-c* having a specified message attribute 118*a-c* and/or value that are to be transmitted to the destination queue 114. In response to the request, the destination queue 114 may be subscribed to the message exchange 110*a-c* (e.g., added to a subscription record) and the exchange filter rule 112 may be added to the message exchange 110*a-c* for filtering messages to the destination queue 114 (e.g., added to exchange filter rules for the message exchange 110*a-c*).

An exchange filter rule 112 may be used to specify which messages are delivered to which destination queues 114 that are subscribed to a message exchange 110*a-c*. An exchange filter rule 112 may be defined, for example, using operators and/or regular expressions to evaluate message attribute values. In one example, message attributes 118*a-c* for a message 102*a-c* may include a message attribute name/value pair. An exchange filter rule 112 may define an expression used to evaluate a particular attribute name/value pair. As a specific example, an exchange filter rule 112 may be defined to evaluate an attribute name/value pair for an attribute name of "DEPT" and an attribute value of "B" and deliver messages having the attribute name/value pair to a specified destination queue 114. As such, the expression "attribute_name=DEPT AND attribute_value=B" may be used to define the exchange filter rule 112.

In other examples, some attribute (characteristic) of a message 102*a-c* may be evaluated using an exchange filter rule 112 (as opposed to a name/value pair). For example, some defining characteristic of a message 102*a-c* may be used in determining which destination queues 114 are to receive the message 102*a-c*. For example, a message's 102*a-c* content, size, source, destination, format, or other attribute of the message 102*a-c* may be evaluated and used to identify destination queues 114 that may be subscribed to receive the message 102*a-c*. As a specific example, a message body of a message 102*a-c* may be parsed to determine whether the message body contains a particular keyword or phrase. In the case that the message body contains the keyword or phrase, the message 102*a-c* may be delivered to specified destination queues 114 subscribed to receive the message 102*a-c*.

After creating a message exchange 110*a-c* and subscribing destination queues 114 to the message exchange 110*a-c*, messages 102*a-c* may be published and sent to the message queuing service 104. Messages 102*a-c* sent by message publishers may be received at a frontend gateway 116 for the message queuing service 104 and may be routed to the shared queue 106 where the messages 102*a-c* may be stored in computer memory. Messages 102*a-c* may be staged in the shared queue 106 until the messages 102*a-c* are retrieved for processing by an exchange processor 108.

The exchange processor 108 may be configured to execute exchange workers (e.g., processing threads) that retrieve messages 102*a-c* from the shared queue 106 and analyze message attributes 118*a-c* for the messages 102*a-c* to determine message exchanges 110*a-c* that are allowed to receive the messages 102*a-c*. In one example of explicit message exchange routing, a message attribute 118*a-c* may be attached to a message 102*a-c* and may be used to identify a message exchange 110a-c associated with a customer account. In another example, routing information for a message 102a-c may include an identity of a message exchange 110a-c, which may be used to identify a message exchange 110a-c for the message 102a-c.

In one example, an exchange worker 122 may retrieve a message 102a-c from the shared queue 106 and analyze an attribute name/value pair attached to the message 102a-c to identify a message exchange 110a-c associated with the message 102a-c. As an illustration, a message 102a-c may have an attribute name/value pair of "XCH, B" that may be identified using an exchange worker 122 as corresponding to a message exchange 110a-c identified as "Exchange B".

After identifying a message exchange 110a-c for a message 102a-c, the message exchange 110a-c may receive the message 102a-c and then identify exchange filter rules 112 that may be associated with the message exchange 110a-c. The exchange filter rules 112 may then be evaluated against message attributes 118a-c of the message 102a-c to determine whether the message attributes 118a-c satisfy any of the exchange filter rules 112. As a specific example, an exchange filter rule 112 may specify that messages 102a-c having the attribute name/value pair "DEPT, B" are to be delivered to destination queues 114 that are subscribed to receive messages 102a-c having the attribute name/value pair "DEPT, B".

In the case that one or more exchange filter rules 112 are satisfied, multiple destination queues 114 specified by an exchange filter rule 112 as receiving the message 102a-c when the exchange filter rule 112 is satisfied may be identified and the message 102a-c may be duplicated and distributed to each of the destination queues 114. As an example, illustrated in FIG. 1 is a message 102a having the attribute name/value pairs "XCH, A" and "DEPT, Q". The message 102a may be processed by an exchange processor 108 and the message 102a may be identified as being associated with message exchange A 110a. Exchange filter rules 112 for message exchange A 110a may be identified and evaluated at message exchange A 110a to determine whether the attribute name/value pair "DEPT, Q" satisfies any of the exchange filter rules 112 for message exchange A 110a. As illustrated, several destination queues 114 are subscribed to the message exchange 110a. Destination queues 114 subscribed to receive messages 102a having the attribute name/value pair "DEPT, Q" may be identified and the message 102a may be duplicated and transmitted to each of the destination queues 114 subscribed to receive the message 102a.

In some examples, a first message exchange may subscribe to a second message exchange enabling the first message exchange to receive messages 102a-c that may be distributed via the second message exchange. As an illustration, a message 102a-c may be sent to the message queuing service 104 and a first message exchange 110a and exchange filter rules 112 for the message 102a-c may be identified. As a result of evaluating the exchange filter rules 112, a second message exchange 110b may be identified as being subscribed to the first message exchange 110a to receive the message 102a-c, and the message 102a-c may then be delivered to the second message exchange 110b for distribution to destination queues subscribed to the second message exchange 110b (i.e., message exchange information may be retrieved from a second message exchange entity and used to deliver the message 102a-c to multiple destination queues identified using the message exchange information).

As a result of allowing a first message exchange to subscribe to a second message exchange, the potential to create infinite loops may exist when a message 102a-c may be sent from one message exchange 110a-c to another message exchange 110a-c without reaching a terminating destination. In one example, an infinite loop may be prevented by deleting a message 102a-c after forwarding the message 102a-c n number of times to other message exchanges 110a-c, thereby detecting an infinite loop resulting from forwarding the message 102a-c to the other message exchanges 110a-c. For example, using a forwarding counter, a number of times a message 102a-c has been forwarded to one message exchange 110a-c to another message exchange 110a-c can be tracked by increasing the forwarding counter each time the message 102a-c is forwarded to a message exchange 110a-c. If the forwarding counter reaches or exceeds a predefined value, the message 102a-c may be deleted.

In one example configuration, delivering messages 102a-c to destination queues 114 may entail identifying computer memory locations for the destination queues 114 in a backend storage infrastructure of the message queuing service 104, and storing the messages 102a-c in the computer memory locations for the destination queues 114. As a result, messages 102a-c transmitted to destination queues 114 may not have to pass through a frontend gateway 116 for the message queuing service 104 to reach the destination queues 114. After the messages 102a-c have been stored in respective destination queues 114, the messages 102a-c may be retrieved by clients configured to retrieve the messages 102a-c from the destination queues 114.

In another example configuration, messages 102a-c may be delivered to destination queues 114 that may be located outside of the backend infrastructure of the message queuing service 104. For example, messages 102a-c may be transmitted back out of a frontend gateway 116 for the message queuing service 104 to destination queues 114 located on external systems.

Figure 2:
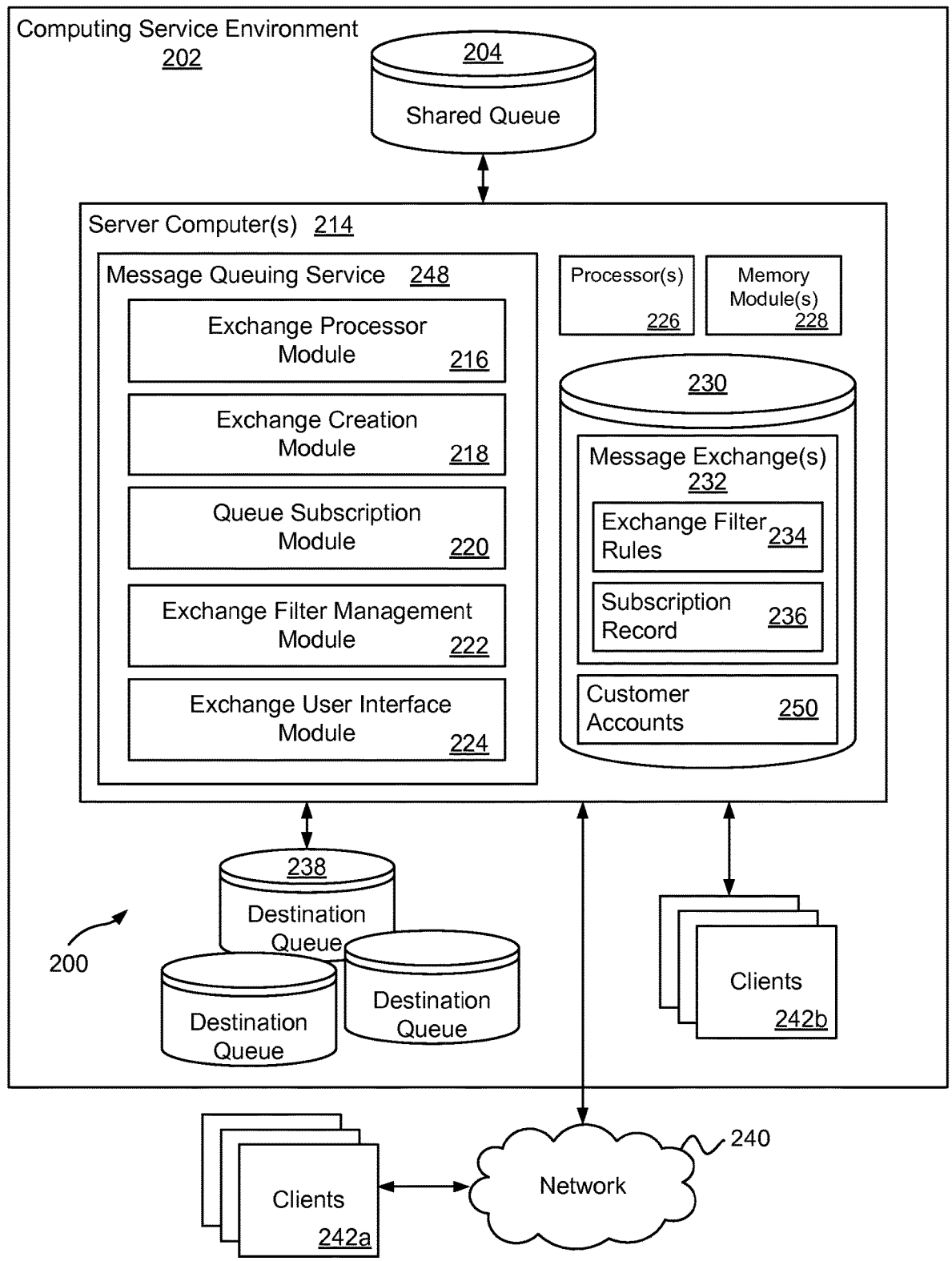
FIG. 2 is a block diagram that illustrates various example components included in a system for distributing messages to destination queues using message exchanges and exchange filter rules.

FIG. 2 illustrates components of an example system 200 on which the present technology may be executed. The system 200 may include a server computer 214 containing a number of modules used to provide a message queuing service 248 hosted within a computing service environment 202. In one example, the server computer 214 may include an exchange processor module 216, an exchange creation module 218, a queue subscription module 220, an exchange filter management module 222 and an exchange user interface module 224.

The exchange processor module 216 may be configured to distribute messages received at a message queuing service to destination queues 238 subscribed to a message exchange 232. In one example configuration, the exchange processor module 216 may execute exchange workers that retrieve messages from a shared queue 204 and process the messages for delivery to multiple destination queues 238. For example, the exchange processor module 216 may manage a pool of exchange workers that execute asynchronous callbacks to report the completion of processing of messages on behalf of the exchange processor module 216.

An exchange worker may be tasked to query the shared queue 204 for a message. In response to the query, the exchange worker may be provided a message having message attributes. For example, an exchange worker may be provided with an address to a memory location where a message and message attributes may be stored, and the exchange worker may use the address to obtain metadata for the message that may be used to process the message.

Alternatively, the exchange worker may use the address to retrieve the message from the memory location and transfer the message to an exchange queue (not shown) that may have been identified as being associated with the message and the message may be processed for delivery to multiple destination queues 238.

As part of processing a message, an exchange worker may identify a message exchange 232 for the message. For example, the exchange worker may be configured to analyze message attributes to identify a message exchange 232 for the message. In one example, a message attribute may include an attribute name/value pair that may be used to identify a message exchange 232 for a message. In another example, routing attributes for a message may be used to identify a message exchange 232 for a message (e.g., a source address and/or a destination address for a message may be used to lookup a message exchange 232 in a cross-reference table). In yet another example, attributes included in a message body for a message may be used to identify a message exchange 232 for the message (e.g., a keyword included in a message body may be used to identify a message exchange 232 that is associated with the keyword). Additional methods for identifying a message exchange 232 for a message are also within the scope of this disclosure. In the case that a message is not associated with a message exchange 232, the message may be delivered directly to an intended destination queue 238.

After identifying a message exchange 232 for the message, the exchange worker may be configured to identify exchange filter rules 234 associated with the message exchange 232. Exchange filter rules 234 may include conditions that when satisfied, allow for a message to be delivered to one or more destination queues 238. An exchange filter rule 234 may specify which destination queues 238 subscribed to a message exchange 232 may receive a message satisfying the conditions of the exchange filter rule 234.

An exchange worker may be configured to analyze message attributes for a message and determine whether any of the message attributes satisfy any of the exchange filter rules 234 associated with a message exchange 232. In the case that the message attributes satisfy an exchange filter rule 234, destination queues 238 specified by the exchange filter rule 234 may be identified (e.g., via a subscription record 236) and the exchange worker may be configured to duplicate and transmit the message to the destination queues 238. For example, memory locations for the destination queues 238 in a backend infrastructure of the message queuing service 248 may be identified and the message may be stored to the memory locations for the destination queues 238. The messages may be retrieved from the destination queues 238 by clients 242a (e.g., client devices) residing outside of the computing service environment 202 and clients 242b (e.g., applications, computing nodes, or services) residing inside the computing service environment 202 for customers owning the destination queues 238.

Customers may create message exchanges 232 using the exchange creation module 218, and the message exchanges 232 may be associated with customer accounts 250 in response to customer requests to create the message exchanges 232. For example, a message exchange 232 may be created for a customer account that allows for delivery of messages published by the customer to multiple destination queues 238 while not delivering to other destination queues 238. In one example, a message exchange 232 may be a data structure (e.g., a record, a data store table, or an object) stored in a data store 230 having message exchange information for delivering messages to destination queues 238. For example, a message exchange 232 may include routing information for subscribed destination queues 238.

In response to a request to create a message exchange 232, a data structure may be created and populated with message exchange information. An identifier may be assigned to the message exchange 232 that, for example, may be included in a message and/or a routing table and used to route messages to the message exchange 232.

Having created a message exchange 232, destination queues 238 may be subscribed to the message exchange 232 using the queue subscription module 220. For example, a customer that owns a message exchange 232 and customers having subscription permissions to the message exchange 232 may subscribe and unsubscribe destination queues 238 to the message exchange 232. In one example, the queue subscription module 220 may be configured to subscribe or unsubscribe destination queues 238 to a message exchange 232 by updating a subscription record 236 for the message exchange 232. For example, the subscription record 236 may be updated to add or remove an identifier for a destination queue 238 being subscribed or unsubscribed to the destination queue 238.

Customers that subscribe a destination queue 238 to a message exchange 232 may define one or more exchange filter rules 234 that may be used to filter messages that may be delivered to the destination queue 238. The exchange filter management module 222 may be configured to add, update, and delete exchange filter rules 234 for message exchanges 232. For example, a customer having subscription permissions to a message exchange 232 may define and submit an exchange filter rule 234 to the exchange filter management module 222 that defines which messages may be delivered to a destination queue 238. Further, the exchange filter management module 222 may be used to update exchange filter rules 234 and delete exchange filter rules 234. For example, customers may submit update or delete requests to the exchange filter management module 222 and the requests may be executed by updating the exchange filter rules 234 for the message exchange 232.

The exchange user interface module 224 may be configured to provide a user interface that allows customers to request the performance of a message queuing service 248 related action. For example, via the exchange user interface module 224, customers may create and delete message exchanges 232, subscribe and unsubscribe destination queues to/from message exchanges 232, and create, modify, and delete exchange filter rules 234.

A customer may utilize a client 242a (e.g., a client device) to access the exchange user interface module 224 and request the performance of a message queuing service 248 related action. A client 242 may include any device capable of sending and receiving data over a network 240. A client 242a may comprise, for example a processor-based system such as a computing device. A client 242a may be a device such as, but not limited to, a desktop computer, laptop or notebook computer, tablet computer, mainframe computer system, handheld computer, workstation, network computer, or other devices with like capability.

The shared queue 204 used to stage messages may be implemented using various storage technologies. For example the shared queue 204 may be distributed across multiple computing instances (e.g., virtual machines that may be instances of a software implementation of a computer that executes applications like a physical machine), or the messages may be stored in a virtualized data store, such as a key-value data store (NoSQL) or an object storage service that stores messages as objects within object stores (e.g., buckets or file directories).

The various processes and/or other functionality contained within the system 200 may be executed on one or more processors 226 that are in communication with one or more memory modules 228. The system 200 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 240 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
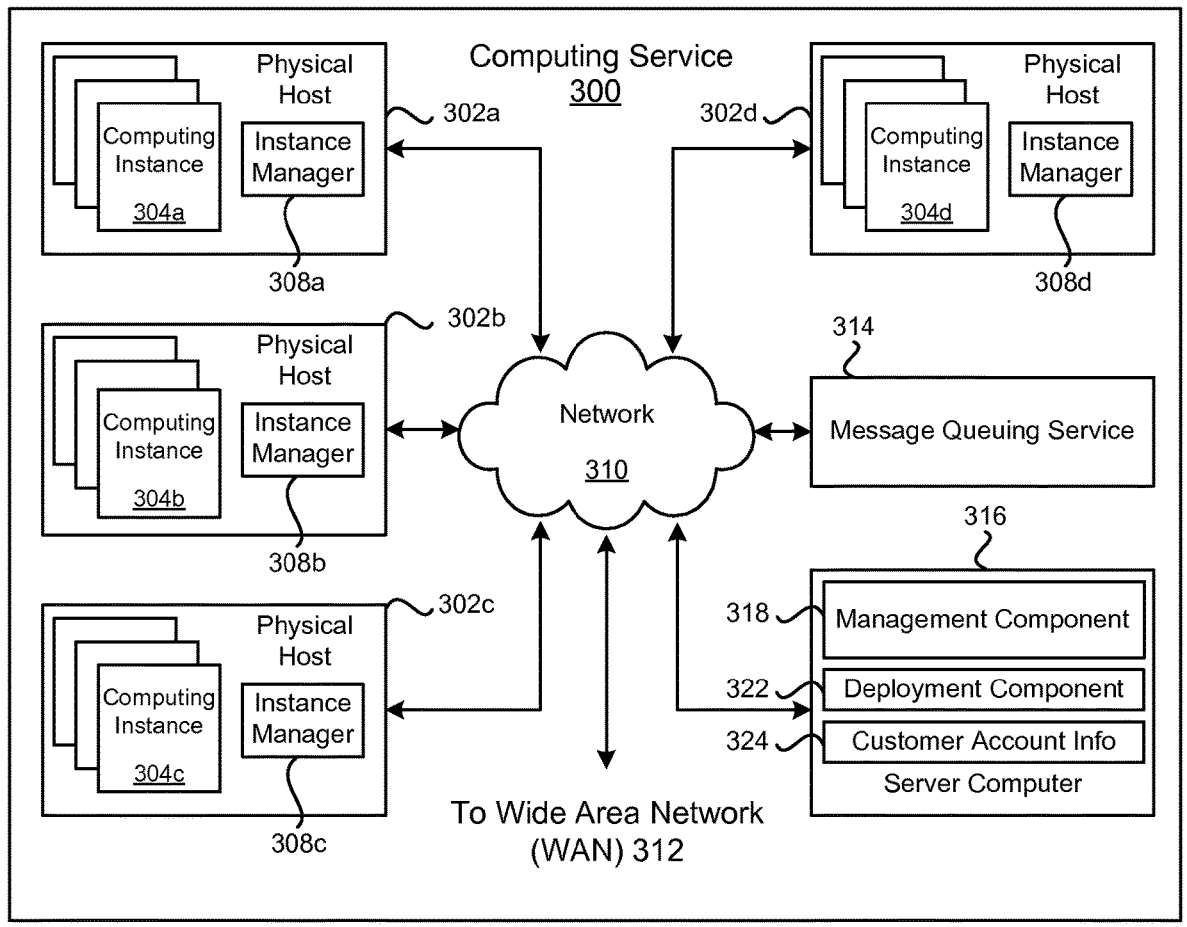
FIG. 3 is a block diagram that illustrates an example computing service environment that includes a message queuing service.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a message queuing service that may perform the functions described earlier, such as processing messages received at the message queuing service and delivering the messages to multiple destination queues as determined by exchange filter rules associated with a message exchange.

In one example, the message queuing service may be scaled according to a processing load placed on the message queuing service. For example, additional computing instances 304a-d used to execute and support the message queuing service may be launched as a result of an increased load on the message queuing service, and computing instances 304a-d may be terminated as a result of a decreased load on the message queuing service.

A server computer 316 may execute a management component 318. A customer may access the management component 318 to configure various aspects of the operation of the computing instances 304a-d purchased by a customer.

For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
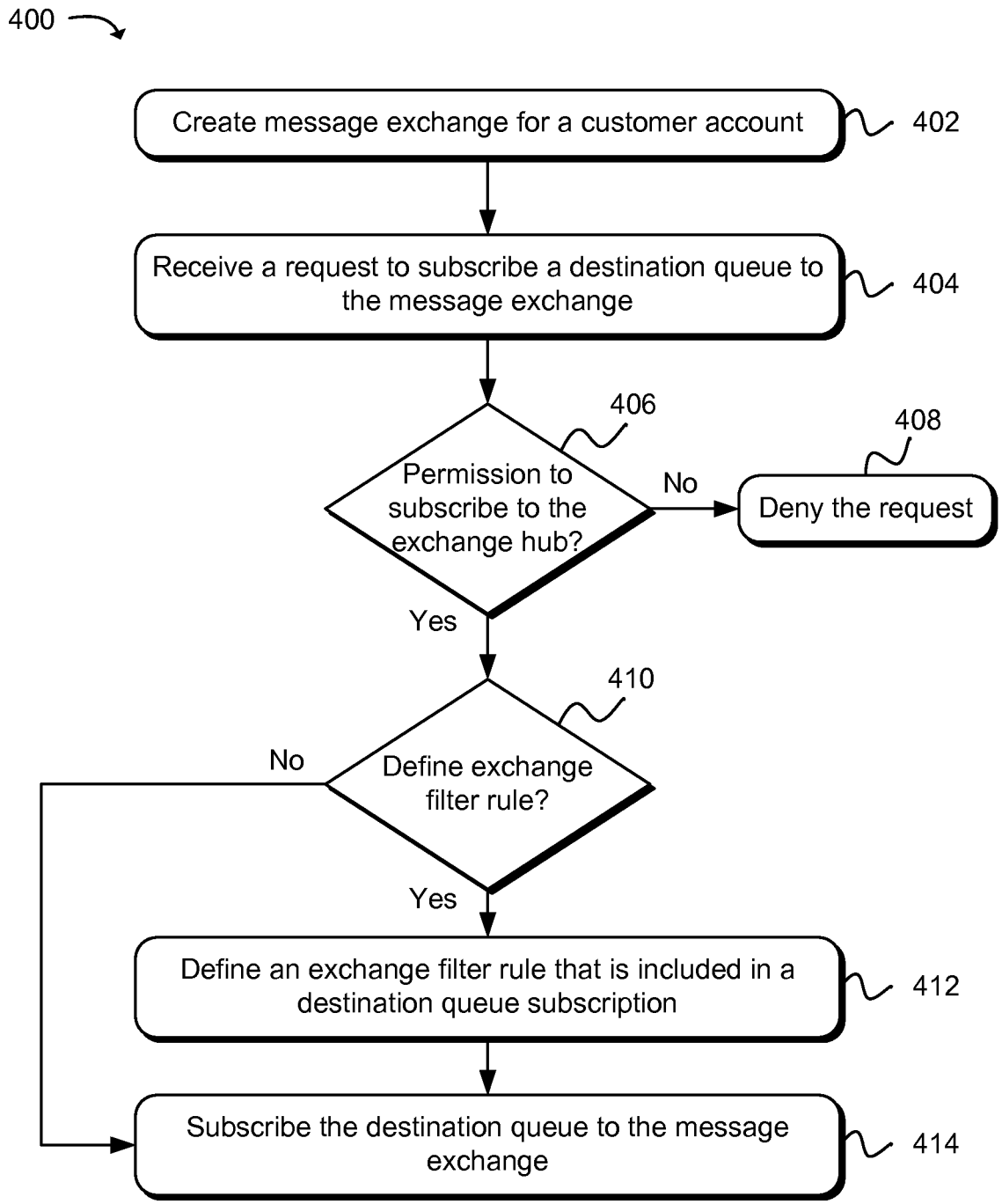
FIG. 4 is a flow diagram illustrating an example method for creating a message exchange and exchange filter rules and subscribing a destination queue to the message exchange.

Moving now to FIG. 4, a flow diagram illustrates an example method 400 for creating a message exchange and subscribing destination queues to the message exchange, as well as defining an exchange filter rule used to determine which messages are delivered to the destination queue. Starting in block 402, a message exchange may be created for a customer account. For example, a request may be received at a message queuing service hosted within a computing service environment to create the message exchange for the customer account. The message exchange may be used to distribute messages to destination queues subscribed to the message exchange.

After the message exchange has been created, destination queues may be subscribed to the message exchange. More specifically, a subscription record for the message exchange may be created and destination queues may be subscribed to the message exchange by adding identifiers for the destination queues to the subscription record. Subscribing a destination queue to the message exchange may include, as in block 404, receiving a request to subscribe a destination queue to the message exchange. In response to the request, as in block 406, a permission check may be performed that determines whether a customer requesting that the destination queue be subscribed to the message exchange has permission to subscribe destination queues to the message queue.

In one example, a validation may be performed to ensure that the customer account associated with the request to subscribe the destination queue has permissions to both the message exchange and the destination queue. For example, an owner of a message exchange may have permissions to subscribe the owner's destination queues to the message exchange. Other customers may subscribe destination queues to the message exchange if the other customers have been granted permission to the message exchange and have permissions to the destination queue being subscribed to the message exchange. In the case that the customer does not have permission, as in block 408, the request to subscribe the destination queue to the message exchange may be denied. In the case that the customer does have permission to subscribe the destination queue to the message exchange, the request may be granted and the destination queue may be added to a subscription record for the message exchange.

In one example, a one-time validation for a customer account may be performed when subscribing a destination queue to a message exchange. The one-time validation may enable transmission of messages to the destination queue without having to revalidate the customer account each time that a message is sent to the destination queue. As an illustration, when a message is received at a message queuing service and a message exchange associated with the message is identified, the message may be dispersed to intended destination queues without having to check whether customer accounts associated with the destination queues have permission to receive the message.

Customers that subscribe a destination queue to the message exchange may also, as in block 410, define one or more exchange filter rules for delivering messages to the destination queue as described earlier. In defining an exchange filter rule, a customer may specify types of messages that the customer would like to receive.

In one example, defining an exchange filter rule may be provided as an option, therefore if a customer chooses not to define an exchange filter rule for the customer's destination queue, all messages distributed through the message exchange may be transmitted to the customer's destination queue. In the case that an exchange filter rule is defined, then as in block 412, the exchange filter rule may be included in the destination queue subscription resulting in messages meeting the conditions of the exchange filter rule to be delivered to the destination queue. After defining an exchange filter rule, then as in block 414, the destination queue may then be subscribed to the message exchange by updating a subscription record for the message exchange with the destination queue and the exchange filter rule.

Figure 5:
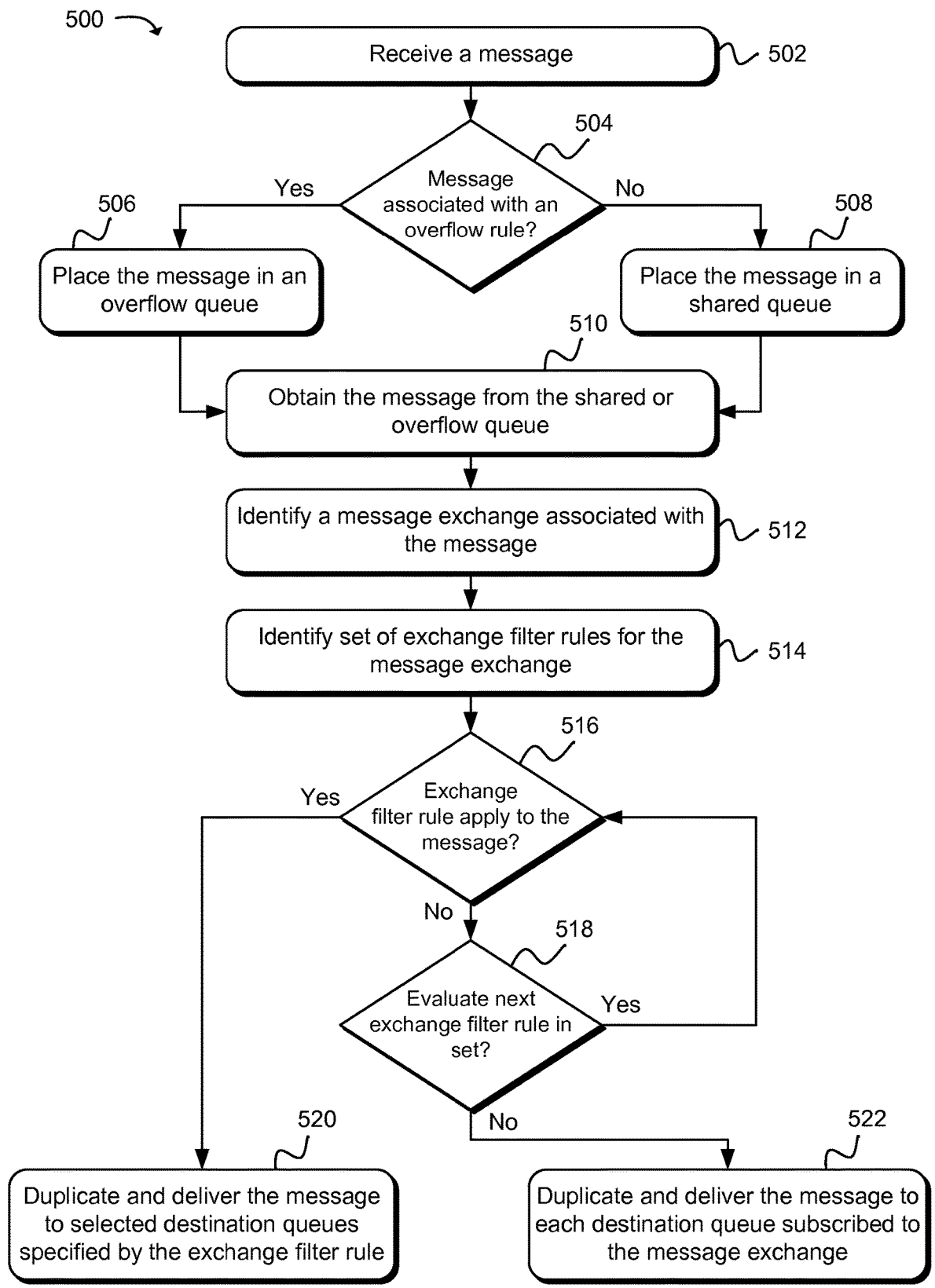
FIG. 5 is a flow diagram that illustrates an example method for processing a message and delivering the message to destination queues specified by an exchange filter rule.

FIG. 5 is a flow diagram illustrating an example method 500 for processing a message received at a message queuing service. Beginning in block 502, a message intended to be distributed to multiple destination queues may be received at the message queuing service. As in block 504, in the case that the message is associated with an overflow rule, then some of the messages associated with the customer, as in block 506, may be placed in an overflow queue.

Overflow rules may be used to identify messages having certain characteristics and place the messages in an overflow queue. As an example, overflow rules may be used to filter lower priority messages from higher priority messages and place the messages in an overflow queue. Illustratively, messages sent from a high rate messaging customer account (e.g., a customer that sends messages at a high rate or configured rate amount as compared to other customers) may be identified and stored in the overflow queue in computer memory as a result of a limited amount of available computer memory for a shared queue. The overflow queue may be processed at a lower priority as compared to a shared queue so that messages associated with customers that are sent at a lower rate are not bottlenecked in the shared queue as a result of a high rate of messages sent by high rate customers being stored in the shared queue. As another illustration, overflow rules may be used to identify messages that exceed a particular message size and place the messages in the overflow queue where the messages may be processed at a lower priority.

In the case that the message is associated with a non-high rate customer, then as in block 508, the message may be placed in the shared queue. As in block 510, the message may be obtained from the shared queue or the overflow queue for processing of the message. In processing the message, as in block 512, a message exchange associated with the message may be identified. As described earlier, message attributes for the message may be analyzed to identify a message exchange associated with the message.

After identifying a message exchange for the message, as in block 514, a set of exchange filter rules for the message exchange may be identified and the exchange filter rules included in the set may be evaluated to determine, as in block 516, whether any of the exchange filter rules apply to the message. For instance, a first exchange filter rule included in a set of exchange filter rules may be evaluated, and in the case that the first exchange filter rule applies to the message, as in block 520, the message may be transmitted to selected destination queues specified by the exchange filter rule. In the case that the first exchange filter rule does not apply to the message, as in block 518, the next exchange filter rule (e.g., a second exchange filter rule) included in the set of exchange filter rules may be evaluated. The process of evaluating the exchange filter rules may be repeated for each exchange filter rule included in the set of exchange filter rules, and the message may be duplicated and transmitted to destination queues associated with each exchange filter rule that is satisfied.

In the case that no filter rules apply to a message, as in block 522, the message may be sent to each destination queue subscribed to the message exchange. In some scenarios, a message exchange may not have any destination queues subscribed to the message exchange. In these cases, messages routed to the message exchange may be dropped (e.g., discarded). In some examples, a message producer that sent a message may be notified that messages routed to the message exchange are being dropped as a result of having no subscribed destination queues and, in some examples, the message producer may be provided with options such as subscribing one or more destination queues to the message exchange and setting up message delivery formats (Short Message Service (SMS), email, etc.) for the message.

As an illustration, a message exchange may be configured to distribute messages related to sales transactions to a particular set of destination queues. The message exchange may have a number of exchange filter rules used to distribute the sales transaction messages. Upon receiving a message having a message attribute that associates the message with a "sporting goods sales transaction", the exchange filter rules for the message exchange may be evaluated using the message attribute. Illustratively, one exchange filter rule may specify that messages having message attributes associating the message with the transaction type "sporting goods sales transactions" are to be delivered to a specified set of destination queues. In evaluating the exchange filter rule using the message attribute, the exchange filter rule may be satisfied and the set of destination queues may be identified and the message may be duplicated and transmitted to the set of destination queues.

Figure 6:
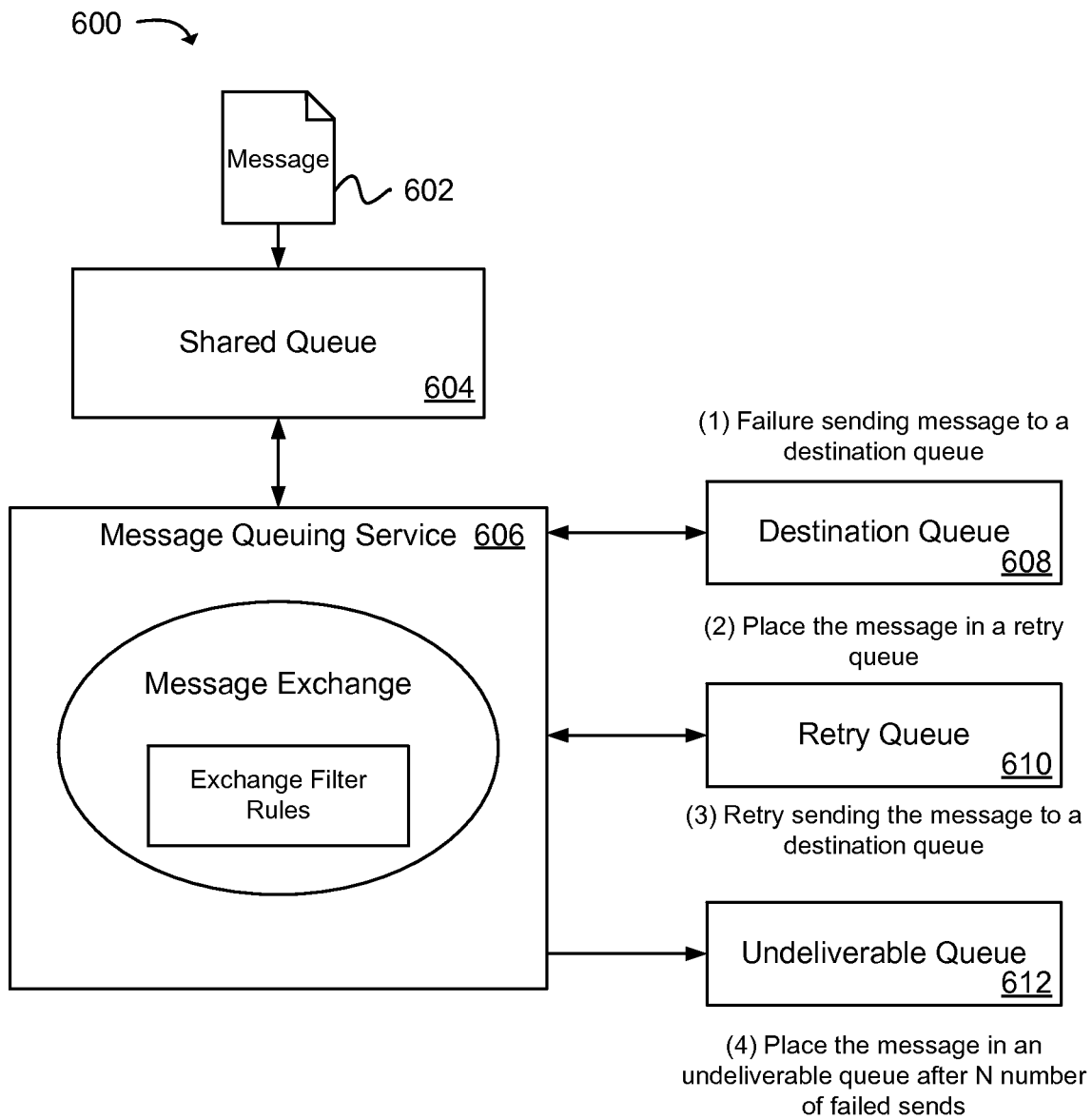
FIG. 6 is a block diagram illustrating an example system that utilizes a retry queue and an undeliverable queue as part of a message queuing service.

FIG. 6 is a block diagram illustrating a system 600 that utilizes a retry queue 610 and an undeliverable queue 612 as part of a message queuing service 606. As illustrated, a message 602 stored in a shared queue 604 may be retrieved from the shared queue 604 using a message queuing service 606. Using exchange filter rules for a message exchange associated with the message 602, a destination queue 608 may be identified and the message 602 may be transmitted to the destination queue 608. In the event that transmission of the message 602 to the destination queue fails 608 (e.g., the destination queue 608 is located on a data cluster that is experiencing an issue, or the message queuing service 606 is experiencing issues), the message 602 may be placed in a retry queue 610.

The retry queue 610 may be used to handle messages 602 that cannot be immediately delivered to a destination queue 608. Transmission of messages 602 placed in the retry queue 610 may be periodically retried. For example, the message 602 placed in the retry queue 610 may be periodically retransmitted to the destination queue 608. In one example, a number of retransmission attempts may be defined. For example, a number of retry times and/or a number of retry minutes may be defined. In the event that retransmission of a message 602 fails a specified number of retry times and/or a number of retry minutes, then the message 602 may be placed in an undeliverable queue 612.

The undeliverable queue 612 may be used to store messages 602 that have failed retransmission from the retry queue 610 to a destination queue 608 a specified number of retry times and/or a number of retry minutes. Messages 602 that end up in the undeliverable queue 612 may need human intervention to remedy a situation that is preventing transmission of the messages 602 (e.g., remedying a network connection failure, data store failure, computing instance failure, etc.).

FIG. 7 illustrates an example user interface 700 that may be used to subscribe a destination queue to a message exchange and define a message filtering rule used in delivering messages to the destination queue. As illustrated, a customer may be presented with a destination queue 702 that the customer has access rights to, and available message exchanges 704 to which the customer may subscribe the destination queue 702 to according to customer account permissions. The user interface 700 may include controls that allow a customer to define exchange filter rules 706 for the subscription of a destination queue. As illustrated in FIG. 7, predefined exchange filtering rules may be provided in the user interface 700 allowing a customer to specify a value or keyword for an exchange filter rule 706 that may be used in evaluating the exchange filter rule 706. Also, a customer may define a custom exchange filter rule 706 by selecting a link control that, when selected by the customer, presents the customer with a customer rule builder user interface.

After entering information used to subscribe a destination queue to an available message exchange 704 and defining one or more exchange filter rules 706, a customer may select a subscribe control 708 that calls an Application Programming Interface (API) configured to subscribe the destination queue to the message exchange 704 according to the exchange filter rules 706. Messages associated with the message exchange 704 that satisfy the exchange filter rules 706 may then be distributed to the destination queue 702.

FIG. 8 is a flow diagram that illustrates and example 800 method for processing a message sent to a message exchange according to exchange filter rules for the message exchange. Beginning in block 810, a message may be obtained from a shared queue in computer memory that contains messages intended for destination queues. The message may include message attributes that contain metadata describing the message.

As in block 820, the message attributes for the message may be analyzed to identify a message exchange associated with the message having at least one destination queue subscribed to the message exchange that receives messages via the message exchange. As in block 830, an exchange filter rule for the message exchange may be identified and used to identify subscribed destination queues linked to the exchange filter rule. The exchange filter rule may specify a value of the message attribute for the message and specify at least one subscribed destination queue that is subscribed to receive the message having the message attribute with the value.

As in block 840, the message attributes of the message may be analyzed to determine whether the value of the message attributes satisfy the exchange filter rule. In the event that the message attributes satisfy the exchange filter rule, then as in block 850, the at least one subscribed destination queue specified by the exchange filter rule that is subscribed to the message exchange to receive the message may be identified, and the message may be transmitted to the at least one subscribed destination queue.

Figure 9:
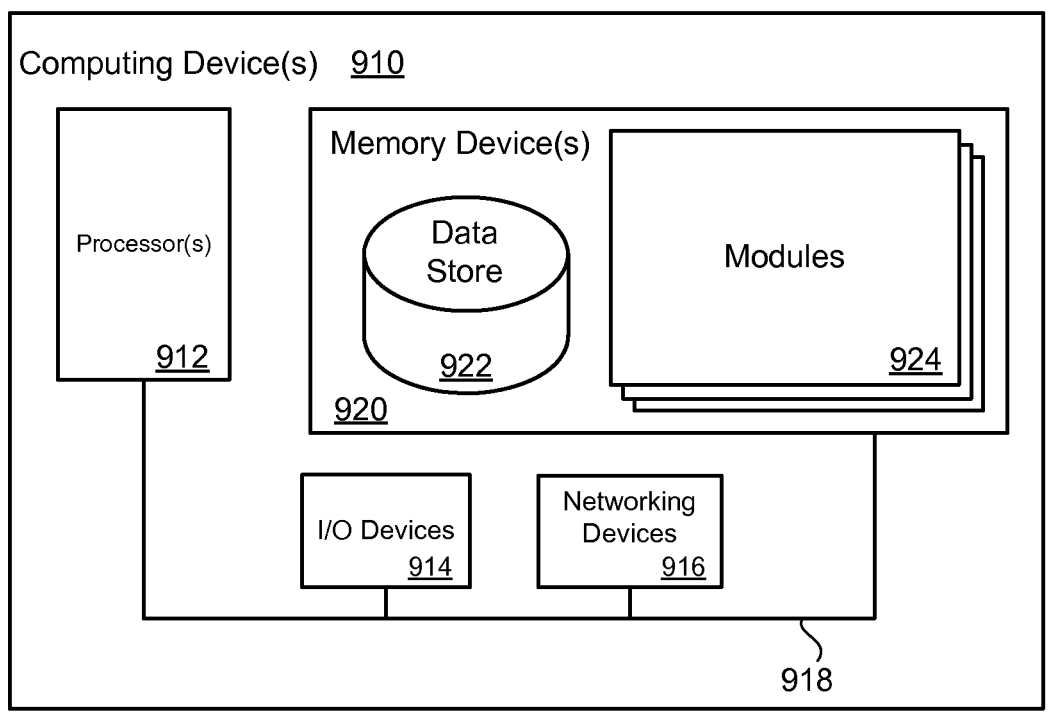
FIG. 9 is block diagram illustrating an example of a computing device that may be used to execute a method for processing a message and delivering the message to destination queues specified by an exchange filter rule.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. For example, the memory device 920 may contain an exchange processor module, an exchange creation module, a queue subscription module, an exchange filter management module, an exchange user interface module, as well as other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A non-transitory machine readable storage medium having instructions embodied thereon, the instructions when executed by a processor:

receiving a message addressed to a message exchange, from a shared queue of a messaging queuing service;

identifying a user-configurable exchange filter rule, at the message exchange, specifying a value of a message attribute wherein a user interface receives commands to configure the user-configurable exchange filter rule from a user;

analyzing message attributes of the message to determine whether the message attributes of the message satisfy the user-configurable exchange filter rule, wherein a destination queue is determined to be subscribed to the message exchange and subsequently the message is determined to satisfy the user-configurable exchange filter rule; and transmitting the message to the destination queue identified to receive the message based on a subscription of the destination queue to the message exchange and a satisfaction of the user-configurable exchange filter rule in the message exchange, wherein the destination queue makes the message available for retrieval by a client device associated with the user.

2. A non-transitory machine readable storage medium as in claim 1, wherein the instructions that when executed by the processor further:

identify computer memory locations for destination queues specified by the user-configurable exchange filter rule in a backend infrastructure of the message queuing service, and send the message to the computer memory locations for the destination queues.

3. A non-transitory machine readable storage medium as in claim 1, wherein the instructions that when executed by the processor further duplicate the message for transfer to destination queues.

4. A computer implemented method, comprising:

receiving a message addressed to a message exchange, from a shared queue of a messaging queuing service;

identifying a user-configurable exchange filter rule, at the message exchange, specifying a value of a message attribute wherein a user interface receives commands to configure the user-configurable exchange filter rule from a customer account; and analyzing message attributes of the message to determine whether the message attributes of the message satisfy the user-configurable exchange filter rule, wherein a destination queue is determined to be subscribed to the message exchange and subsequently the message is determined to satisfy the user-configurable exchange filter rule, wherein the destination queue makes the message available for retrieval by a client device associated with the customer account.

5. A method as in claim 4, further comprising:

receiving the message at a gateway for a message queuing service configured to manage message queuing for customer accounts; and storing the message in the shared queue in computer memory.

6. A method as in claim 4, wherein identifying the destination queue further comprises identifying the destination queue in a data storage infrastructure of a message queuing service configured to manage message queuing for customer accounts;

creating message copies of the message; and transmitting the message copies to the at least one subscribed destination queue located in the data storage infrastructure of the message queuing service.

7. A method as in claim 4, further comprising receiving a request at a message queuing service hosted within a computing service environment to create the message exchange for a customer account that is used to distribute the messages to the destination queues subscribed to the message exchange.

8. A method as in claim 4, further comprising receiving a request at a message queuing service to subscribe a destination queue to the message exchange that includes the user-configurable exchange filter rule defining messages having a specified message attribute and value that are transmitted to the destination queue.

9. A method as in claim 8, further comprising:
determining permission for a customer account to subscribe the destination queue to the message exchange; and
subscribing the destination queue to the message exchange as a result of the customer account having permission to subscribe to the message exchange.

10. A method as in claim 9, wherein determining permission for the customer account further comprises performing a validation for the customer account that allows subscription of the destination queue to the message exchange.

11. A method as in claim 4, further comprising placing the message in a retry queue as a result of a failure to transmit the message to a subscribed destination queue.

12. A method as in claim 4, further comprising placing the message in an undeliverable queue as a result of a number of failed attempts to transmit the message to a subscribed destination queue.

13. A method as in claim 4, further comprising:
receiving messages at a high rate that are associated with a high rate messaging customer account at a message queuing service; and
storing the messages in an overflow queue, wherein the messages are retrieved from the overflow queue at a lower priority as compared to a priority for retrieving messages from the shared queue.

14. A method as in claim 4, further comprising notifying a message producer that messages published by the message producer and routed to the message exchange are being discarded as a result of no destination queues being subscribed to the message exchange.

15. A method as in claim 4, further comprising deleting the message after forwarding the message a number of times to other message exchanges.

16. A method as in claim 4, further comprising receiving requests via an Application Programming Interface (API) to subscribe destination queues to the message exchange according to exchange filter rules or to unsubscribe the destination queues from the message exchange.

17. A method as in claim 4, further comprising transmitting the message attributes for the message separately from a message body for the message from a message producer to a message queuing service that is configured to manage message queuing for customer accounts.

18. A system comprising:
a processor;
a memory device including instructions that, when executed by the processor, cause the system to:
create a message exchange associated with a customer account in response to a request from a first customer;
receive a request a subscription of a destination queue to the message exchange having a user-configurable exchange filter rule associated with a message attribute and value for messages that are transmitted to the destination queue, wherein a user interface receives commands to configure the user-configurable exchange filter rule from a second customer subscribed to a message queueing service;
receive a message at the message queuing service that includes message attributes and the message is intended for the destination queue subscribed to the message exchange, wherein the destination queue is determined to be subscribed to the message and subsequently the user-configurable exchange filter rule is applied to the message;
analyze a message attribute and a value for the message to determine whether the value satisfies the user-configurable exchange filter rule; and
transmit the message to the destination queue subscribed to the message exchange as a result of the value satisfying the user-configurable exchange filter rule and the subscription to the message exchange, wherein the destination queue makes the message available for retrieval by a client device associated with the second customer.

19. A system as in claim 18, wherein the memory device includes instructions that, when executed by the processor, causes the system to execute a user interface that allows a customer of a computing service provider to subscribe the destination queue to the message exchange and specify exchange filter rules for transmitting messages to the subscribed destination queues, wherein the customer specifies a message attribute name and a value for the message attribute that is used to define the user-configurable exchange filter rule.

20. A system as in claim 18, wherein the memory device includes instructions that, when executed by the processor, causes the system to:
launch additional computing instances used to execute and support the message queuing service as a result of an increased load on the message queuing service; and
terminate computing instances used to execute and support the message queuing service as a result of a decreased load on the message queuing service.

* * * * *